(12) United States Patent
Sethia et al.

(10) Patent No.: US 8,238,458 B2
(45) Date of Patent: Aug. 7, 2012

(54) IQ IMPAIRMENT ESTIMATION IN AN OFDM SIGNAL

(75) Inventors: Prakash Sethia, Bangalore (IN); Ramesh Krishnan, Bangalore (IN); Nikhil Deshmukh, Bangalore (IN)

(73) Assignee: National Instruments Corporation, Austin, TX (US)

( * ) Notice: Subject to any disclaimer, the term of this patent is extended or adjusted under 35 U.S.C. 154(b) by 296 days.

(21) Appl. No.: 12/684,466

(22) Filed: Jan. 8, 2010

(65) Prior Publication Data

US 2011/0103496 A1 May 5, 2011

Related U.S. Application Data

(60) Provisional application No. 61/257,219, filed on Nov. 2, 2009.

(51) Int. Cl.
*H04L 27/28* (2006.01)

(52) U.S. Cl. ........ 375/260; 375/295; 375/296; 375/346; 375/350; 455/63.1; 455/67.13; 455/114.2; 455/296; 455/501; 370/210; 370/480; 341/173; 341/180; 327/551

(58) Field of Classification Search .................. 375/260, 375/295, 296, 346, 350; 370/210, 480; 455/63.1, 455/67.13, 114.2, 296, 501; 341/173, 180; 327/551

See application file for complete search history.

(56) References Cited

U.S. PATENT DOCUMENTS

| | | | |
|---|---|---|---|
| 6,795,693 B2 | 9/2004 | Balech | |
| 6,882,691 B2 | 4/2005 | Chiodini | |
| 7,139,536 B2 | 11/2006 | Chiu | |
| 7,184,714 B1 | 2/2007 | Kutagulla et al. | |
| 7,305,024 B2 | 12/2007 | Sasson et al. | |
| 7,652,976 B2 | 1/2010 | Wen et al. | |
| 7,653,164 B2 | 1/2010 | Lin et al. | |
| 7,822,399 B2 | 10/2010 | Wallen et al. | |
| 2004/0165678 A1 | 8/2004 | Nadiri | |
| 2006/0270375 A1 | 11/2006 | Beamish et al. | |
| 2007/0002878 A1 | 1/2007 | Moorti et al. | |
| 2008/0219386 A1* | 9/2008 | Chrabieh et al. | 375/343 |
| 2009/0325516 A1 | 12/2009 | Safavi | |

* cited by examiner

*Primary Examiner* — Leon Flores
(74) *Attorney, Agent, or Firm* — Meyertons Hood Kivlin Kowert & Goetzel, P.C.; Jeffrey C. Hood

(57) ABSTRACT

System and method for evaluating a transmitter by estimating IQ impairments in an orthogonal frequency division multiplexed (OFDM) signal generated by the transmitter. The OFDM signal may be received. The OFDM signal may represent a stream of symbols, each comprising a plurality of subcarriers. At least a subset of the subcarriers may be pilot subcarriers. The pilot subcarriers may be grouped into one or more groups of pilot subcarriers based on one or more conditions: a pilot subcarrier which satisfies a condition in its relation to a mirror subcarrier may be grouped with other pilot subcarriers which also satisfy the condition in relation to mirror subcarriers. An estimate of one or more of gain imbalance or quadrature skew of the OFDM signal may be calculated based on the one or more groups of pilot subcarriers and the one or more conditions. The estimate may be used to evaluate the transmitter.

20 Claims, 9 Drawing Sheets

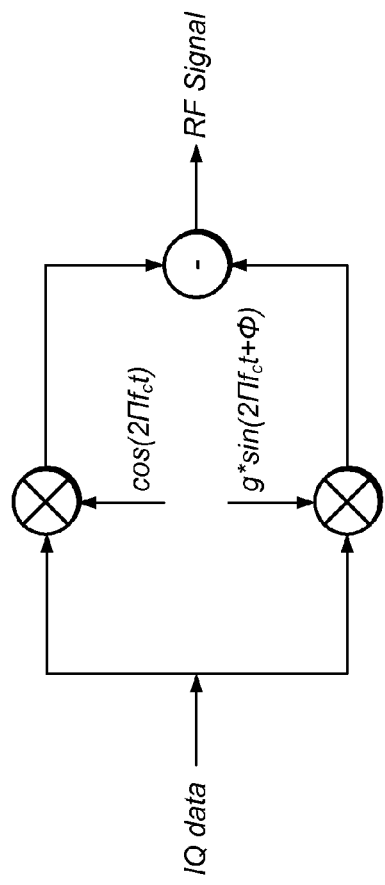

Burst Constellation

Burst Constellation

Burst Constellation

Burst Constellation

IQ IMPAIRMENT ESTIMATION IN AN OFDM SIGNAL

PRIORITY CLAIM

This application claims benefit of priority to provisional Application No. 61/257,219, filed Nov. 2, 2009, titled "IQ Impairment Estimation in an OFDM Signal", whose inventors are Prakash Sethia, Ramesh Krishnan, and Nikhil Deshmukh, which is hereby incorporated by reference in its entirety as though fully and completely set forth herein.

FIELD OF THE INVENTION

The present invention relates in general to orthogonal frequency division multiplexing (OFDM), and in particular to a system and method for estimating IQ impairments in an OFDM signal.

DESCRIPTION OF THE RELATED ART

Orthogonal Frequency Division Multiplexing (OFDM) is an efficient modulation scheme used in many of the current and future wireless standards. Although OFDM has proven to be a powerful modulation technique, it has its own challenges. Various impairments can degrade the performance of OFDM systems if the system and transceivers are not properly designed.

For example, OFDM is sensitive to non-idealities in the receiver front-end. This may lead to either heavy front-end specifications (and thus an expensive front-end), or significant performance degradation. For example, in OFDM systems an IQ modulator typically modulates the in-phase (I) and quadrature-phase (Q) components of a baseband signal at a desired carrier frequency. The transmitted signal that passes through the IQ modulator may go through significant distortion because of imperfections in the I and Q paths of the modulator. These distortions can affect the performance of the OFDM systems. Thus, IQ imbalance is a key parameter that affects the performance of the OFDM systems.

Due to the baseband and RF challenges of these systems, the integrated research and design of these systems requires realistic testing and verification platforms. This work involves test and measurement of IQ gain imbalance and quadrature skew in IQ modulators for OFDM based systems. Thus, there is a need for test equipment to correctly estimate the IQ gain imbalance and quadrature skew from a device under test under laboratory conditions.

SUMMARY OF THE INVENTION

Various embodiments are presented of a system and method for estimating IQ impairments in an orthogonal frequency division multiplexed (OFDM) signal. The method may be implemented by a computer system, e.g., including one or more processors and a computer readable memory medium which stores program instructions executable by the one or more processors to implement the method. The system may include an input for receiving the OFDM signal. Embodiments are also contemplated which include a computer readable memory medium which stores program instructions executable by a computer system to implement the method.

The OFDM signal may be received. The OFDM signal may represent a stream of symbols, where each symbol includes a plurality of subcarriers. At least a subset of the plurality of subcarriers may be pilot subcarriers. In some embodiments, the pilot subcarriers may be binary phase shift keyed (BPSK) subcarriers. One or more signal processing techniques may be performed on the OFDM signal. For example, in some embodiments the one or more signal processing techniques may include downconverting the OFDM signal to a complex baseband signal. In some embodiments, the one or more signal processing techniques may include estimating one or more other impairments to the OFDM signal, such as a timing offset and/or a frequency offset. The one or more signal processing techniques may also or alternatively include compensating for one or more other impairments to the OFDM signal, such as the timing offset and/or the frequency offset. In addition, in some embodiments, the one or more signal processing techniques may include converting the OFDM signal to a frequency domain, e.g., using a discrete Fourier transform.

In some embodiments, the phases of the pilot subcarriers may be calculated. A straight line may be fit to the phases of the pilot subcarriers, and an intercept and slope of the fitted straight line may be estimated. The intercept and slope of the fitted straight line may be used to compensate for one or more of a residual frequency offset, phase noise, a sampling clock offset, and/or timing error. This may produce a compensated frequency domain signal.

The pilot subcarriers may be grouped into one or more groups of pilot subcarriers based on one or more conditions. The conditions may relate a pilot subcarrier to its mirror subcarrier. For example, a pilot subcarrier which relates to a mirror subcarrier in such a way as to satisfy a condition is grouped with other pilot subcarriers which relate to mirror subcarriers in such a way as to satisfy the condition. In some embodiments, for a pilot subcarrier $x_m(n)$ and a mirror pilot subcarrier $x_{-m}(n)$ of a symbol n, the one or more conditions may include one or more of:

$$x_m(n)=x_{-m}(n);$$

$$x_m(n)=-x_{-m}(n); \text{ or}$$

$$x_m(n)=1 \text{ and } x_{-m}(n)=0;$$

An estimate of one or more of gain imbalance or quadrature skew of the received OFDM signal may be calculated based on the one or more groups of pilot subcarriers and the one or more conditions. In some embodiments, calculating the estimate of one or more of gain imbalance or quadrature skew of the received OFDM signal based on the one or more groups of pilot subcarriers and the one or more conditions may be based on a model of the OFDM signal. For example, the estimate might be based on a model in which:

$$x(t)=\cos(2\pi \cdot f \cdot t)+j \cdot g \cdot \sin(2\pi \cdot f \cdot t+\Phi)$$

where x(t) represents the OFDM signal in the time domain, f represents a carrier frequency, g represents the gain imbalance, and $\Phi$ represents the quadrature skew.

The estimate of the gain imbalance and/or quadrature skew of the received OFDM signal may be used to evaluate the transmitter that generated the OFDM signal.

BRIEF DESCRIPTION OF THE DRAWINGS

A better understanding of the present invention can be obtained when the following detailed description of the preferred embodiment is considered in conjunction with the following drawings, in which:

FIGS. 3-4 illustrate exemplary embodiments of a test setup;

FIG. 5 illustrates an IQ modulator with gain imbalance and quadrature skew according to one embodiment;

Figure 1:
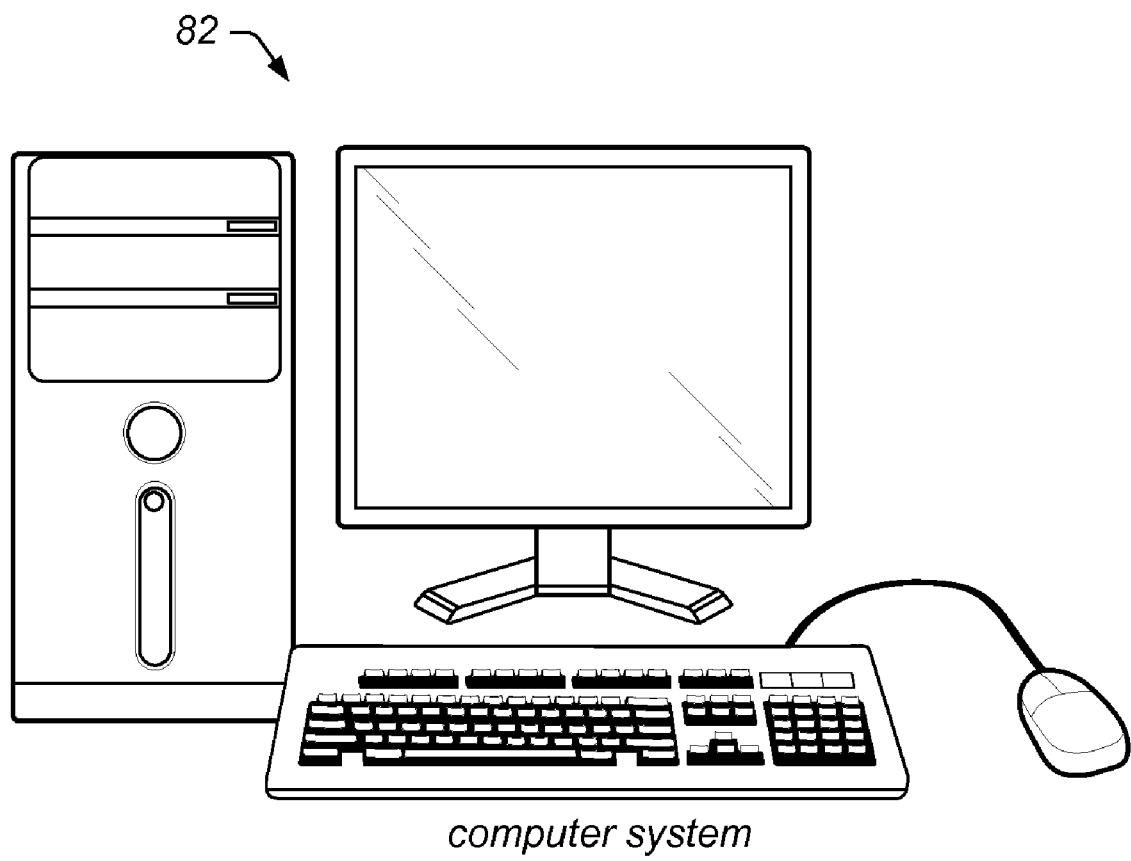
FIG. 1 illustrates an exemplary computer system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms:

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a PROM, EPROM, EEPROM, flash memory, or magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

FIG. 1—Computer System

FIG. 1 illustrates an exemplary computer system 82. As shown in FIG. 1, the computer system 82 may include a display device operable to display. The computer system 82 may include at least one memory medium on which one or more computer programs or software components according to embodiments of the present invention may be stored. For example, the memory medium may store one or more programs which are executable by the computer system 82 to perform the methods described herein. The memory medium may also store operating system software, as well as other software for operation of the computer system. A system which implements embodiments of the invention may also include a programmable hardware element, such as an FPGA, which implements the methods described herein.

Figure 2:
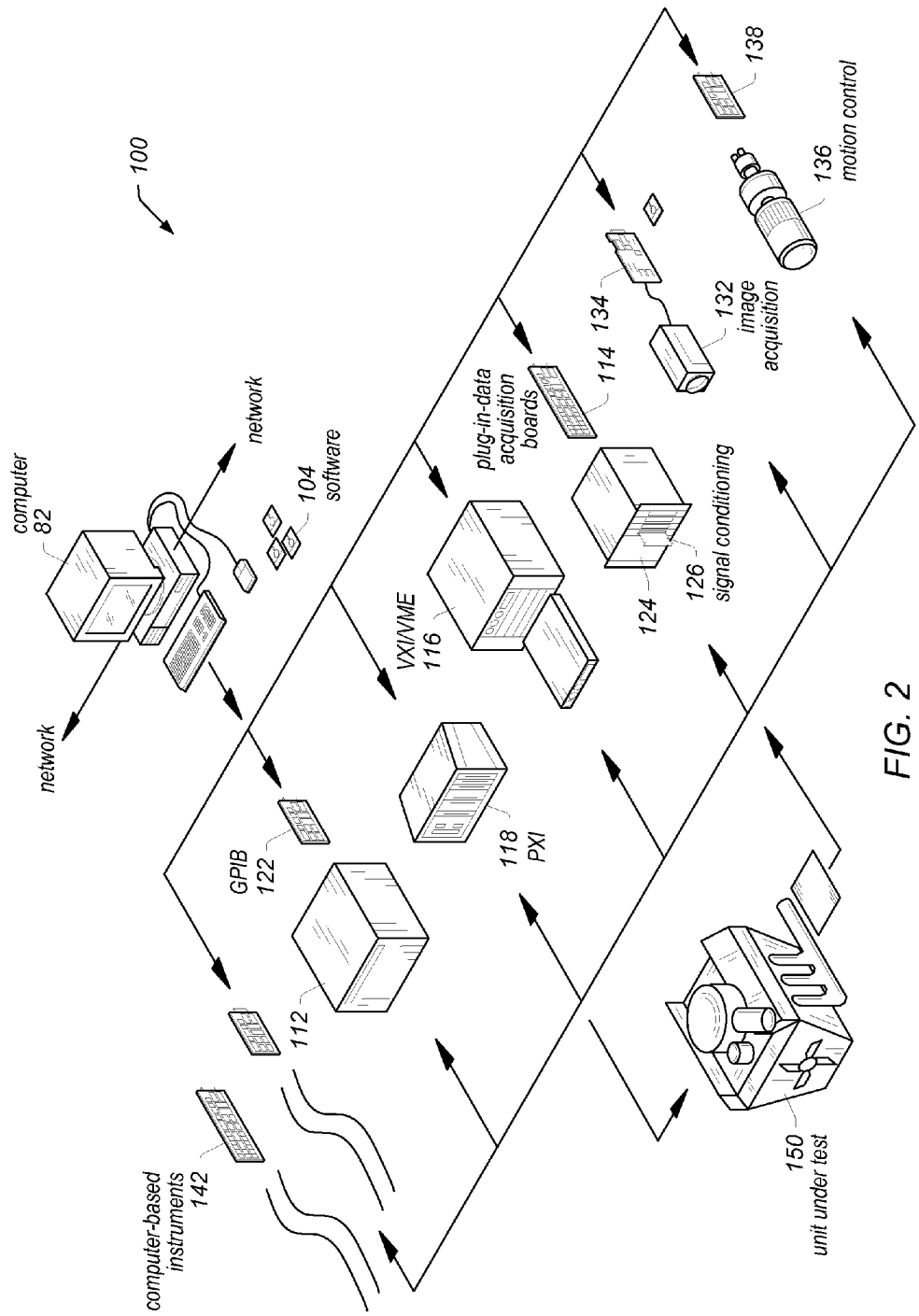
FIG. 2 illustrates an exemplary testing/measurement system according to one embodiment.

FIG. 2—Exemplary Testing/Measurement System

Embodiments of the present invention may be involved with performing test and/or measurement functions. For example, some embodiments relate to testing OFDM signals from RF transmitters for IQ impairments. However, it is noted that embodiments of the present invention can be used for a plethora of applications and are not limited to the above application. In other words, many of the applications discussed in the present description are intended to be exemplary, and any specific embodiments described in this disclosure should not be considered limiting of the disclosure as a whole. Embodiments of the system and method presented herein may be used in any of various types of OFDM applications.

FIG. 2 illustrates an exemplary instrumentation control system 100 which may implement embodiments of the invention. The system 100 comprises a host computer 82 which couples to one or more instruments. The host computer 82 may comprise a CPU, a display screen, memory, and one or more input devices, such as a mouse or keyboard as shown. The computer 82 may operate with the one or more instruments to analyze, measure or control a unit under test (UUT) (also referred to as a device under test (DUT)) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers.

FIGS. 3-4—Exemplary Test Setups

A device which is configured to transmit OFDM signals may produce the OFDM signals by upconverting a baseband signal to an RF signal. For example, time domain complex baseband samples may be passed through a Digital to Analog Converter (DAC) to an IQ modulator. The IQ modulator may then modulate the in-phase (I) and quadrature-phase (Q) components with a desired carrier frequency. If there are I and Q path imperfections present in the IQ modulator (as may typically be the case), the transmitted signal may incur significant distortion, which can affect the performance of OFDM systems. Hence, there may be a need to estimate such IQ impairments in various OFDM devices.

Accordingly, the integrated design and research for the baseband and RF challenges of OFDM systems require realistic testing and verification platforms. This work will involve test and measurement of IQ gain imbalance and quadrature skew in IQ modulators for OFDM based systems. FIGS. 3-4 illustrate exemplary embodiments of a test setup that may be used to test devices for IQ impairments in OFDM signals according to embodiments of the method disclosed herein.

The method may be used for any OFDM systems, e.g., various embodiments may be used to estimate IQ impairments in OFDM signals according to any of a variety of standards. For example, embodiments are contemplated in which the device under test produces OFDM signals according to the IEEE 802.16-2004 and IEEE 802.16e-2005 Wireless MAN OFDMA Physical layer standard; other types of OFDM signals (e.g., according to various other standards) are also contemplated.

FIG. 3 illustrates an exemplary test setup in which a device under test 302 produces OFDM signals. In laboratory test conditions the device under test 302 may be put in a test mode to generate a standard compliant signal without any impairment added to it. The signals produced by the DUT 302 may be acquired (e.g., through a good quality cable) by a measurement device 304 (e.g., an RF signal analyzer such as the NI RFSA-NI-5663 from National Instruments Corporation). The OFDM signals may then be acquired from the measurement (e.g., signal analyzer) hardware of the measurement device 304 by a computer system 306. The computer system 306 may then implement a method for estimating IQ impairments (e.g., according to an embodiment of this disclosure) in order to estimate any IQ impairments in the signal produced by the device under test 302. According to various embodiments, the computer system 306 may be implemented in any of the various ways described above with respect to computer system 82 shown in FIGS. 1 and 2. It should be noted that according to some embodiments, the measurement hardware (e.g., measurement device 304) may be incorporated in computer system 306.

FIG. 4 illustrates an exemplary test setup in which a signal generator 402 (e.g., an RF signal generator such as the NI RFSG-NI5673 from National Instruments Corporation) is used to simulate a device under test by generating OFDM signals (e.g., including simulated IQ impairments) in order to test the accuracy of the method for estimating IQ impairments in an OFDM signal disclosed herein according to various embodiments. As in the setup shown in FIG. 3, the signals generated by the signal generator 402 shown in FIG. 4 may be acquired by a measurement device 304, and in turn by a computer system 306 which may implement the method for estimating IQ impairments in an OFDM signal according to any of the various embodiments described herein. As with the system shown in FIG. 3, it will be noted that embodiments are also contemplated in which the measurement hardware (e.g., measurement device 304) may be incorporated in computer system 306.

FIG. 5—IQ Modulator with Gain Imbalance and Quadrature Skew

In a transmitter configured to produce OFDM signals, the information bits from upper layers may first be channel encoded and then be mapped to complex symbols based on the modulation type used. For example, different mapping options available in IEEE 802.16-2004 and IEEE 802.16e-2005 Wireless MAN OFDMA Physical layer include quadrature phase-shift keying (QPSK), 16 quadrature amplitude modulation (QAM) and 64QAM. Pilot subcarriers (e.g., reference subcarriers which are known) may be inserted in between the data subcarriers. The Pilot subcarriers may be modulated using binary phase-shift keying (BPSK) modulation. After mapping all of the subcarriers required to generate an OFDM symbol, the subcarriers may be passed through a serial to parallel data block and an Inverse Discrete Fourier Transform may be applied to this signal. In the transmitter RF front end the baseband signal may be upconverted to the RF signal. The time domain complex baseband samples may be passed through a Digital to Analog Converter (DAC) and thence to an IQ modulator. The IQ modulator may modulate the in-phase and quadrature-phase components with a desired carrier frequency to produce an RF signal. FIG. 5 illustrates an IQ modulator according to one embodiment.

An RF signal produced by an ideal IQ modulator after up conversion, i.e., a signal with no gain imbalance and zero quadrature skew, can be written as:

$$s(t)=\text{Real}(x(t) \cdot x_{LO}(t))=\text{Real}(x(t)) \cdot \cos(2\pi f_c t) - \text{Imag}(x(t)) \cdot \sin(2\pi f_c t) \quad (1)$$

Where $x(t)$ denotes complex baseband signal and $f_c$ denotes the carrier frequency. $x_{LO}(t)=\cos(2\pi f_c t)+j \sin(2\pi f_c t)$ denotes the local oscillator signal assuming perfect signal without impairments.

Unfortunately, perfect analog mixing is not possible in practice. Because of unavoidable tolerances in the manufacturing process, at least some error can be expected from the ideal 90° phase shift between I and Q branches and unequal gain can be expected in the I and Q branches. These impairments can be modeled by a complex local oscillator signal with gain imbalance g and phase imbalance (also referred to as quadrature skew) $\Phi$:

$$x_{LO}(t)=\cos(2\pi f_c t)+j \cdot g \cdot \sin(2\pi f_c t + \Phi) \quad (2)$$

Complex IQ imbalance parameters K1 and K2 can be defined as:

$$K1 = \frac{1+ge^{-j\phi}}{2}, \quad K2 = \frac{1-ge^{+j\phi}}{2} \quad (3)$$

Equation (2) can thus be written as function of K1 and K2:

$$x_{LO}(t)=K1 \cdot \exp(j \cdot 2\pi f_{LO} t)+K2 \cdot \exp(-j \cdot 2\pi f_{LO} t) \quad (4)$$

Given equation (4), the up conversion with IQ impairments can be interpreted as a superposition of desired complex up conversion, weighted by K1, and undesired complex down conversion, weighted by K2:

$$z(t)=\text{Real}(x(t) \cdot x_{LO}(t))=K1 \cdot s(t)+K2 \cdot s^*(t) \quad (5)$$

The superposition results in mutual interference of a desired subcarrier with its image subcarrier in an OFDM symbol. Thus, a received subcarrier (and its image subcarrier) in frequency domain can be written as $$z_m(n)=K1 \cdot x_m(n)+K2 \cdot x^*_{-m}(n) \quad (6)$$

$$z_{-m}(n)=K1 \cdot x_{-m}(n)+K2 \cdot x^*_m(n) \quad (7)$$

Where $x_m(n)$ is the actual complex QAM symbol transmitted on $m^{th}$ subcarrier of $n^{th}$ OFDM symbol, and $z_m(n)$ is the received complex QAM symbol on $m^{th}$ subcarrier of $n^{th}$ OFDM symbol.

The received signal in frequency domain after down conversion and low pass filtering can be written as equations (6) and (7), assuming an ideal receiver. This assumption may be valid at least for a test instrument (e.g., measurement device in FIGS. 3 and 4) because the specs of test instruments may typically be much better than the commercial transmitter/receiver RF front ends.

Figure 6:
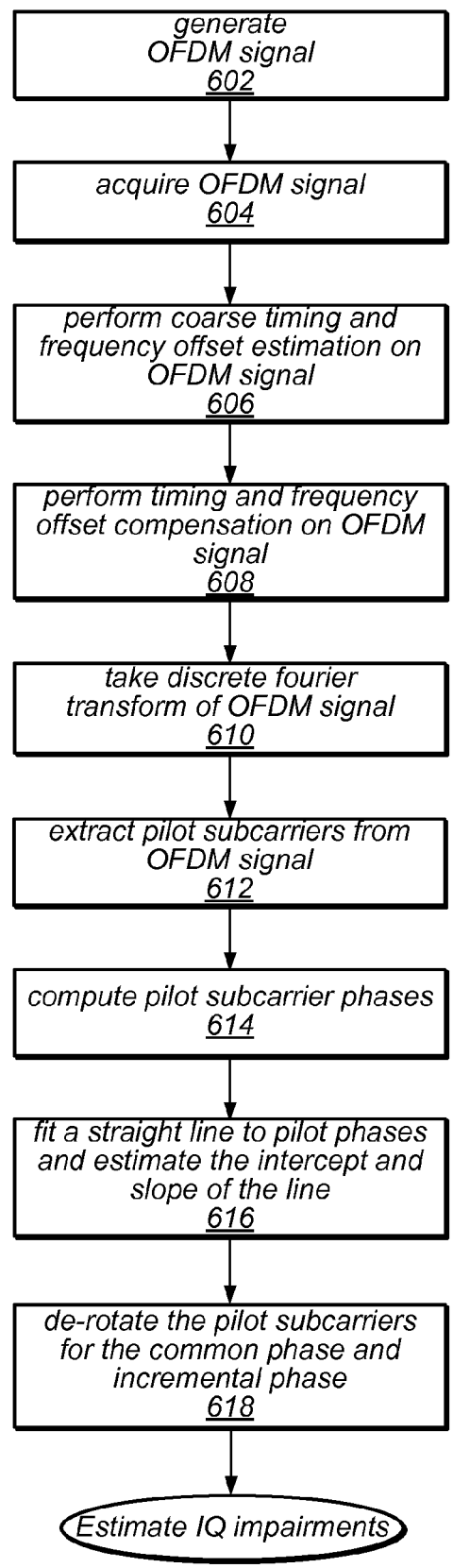
FIGS. 6-7 are flowchart diagrams illustrating a method for estimating IQ impairments in an OFDM signal according to one embodiment.
Figure 7:
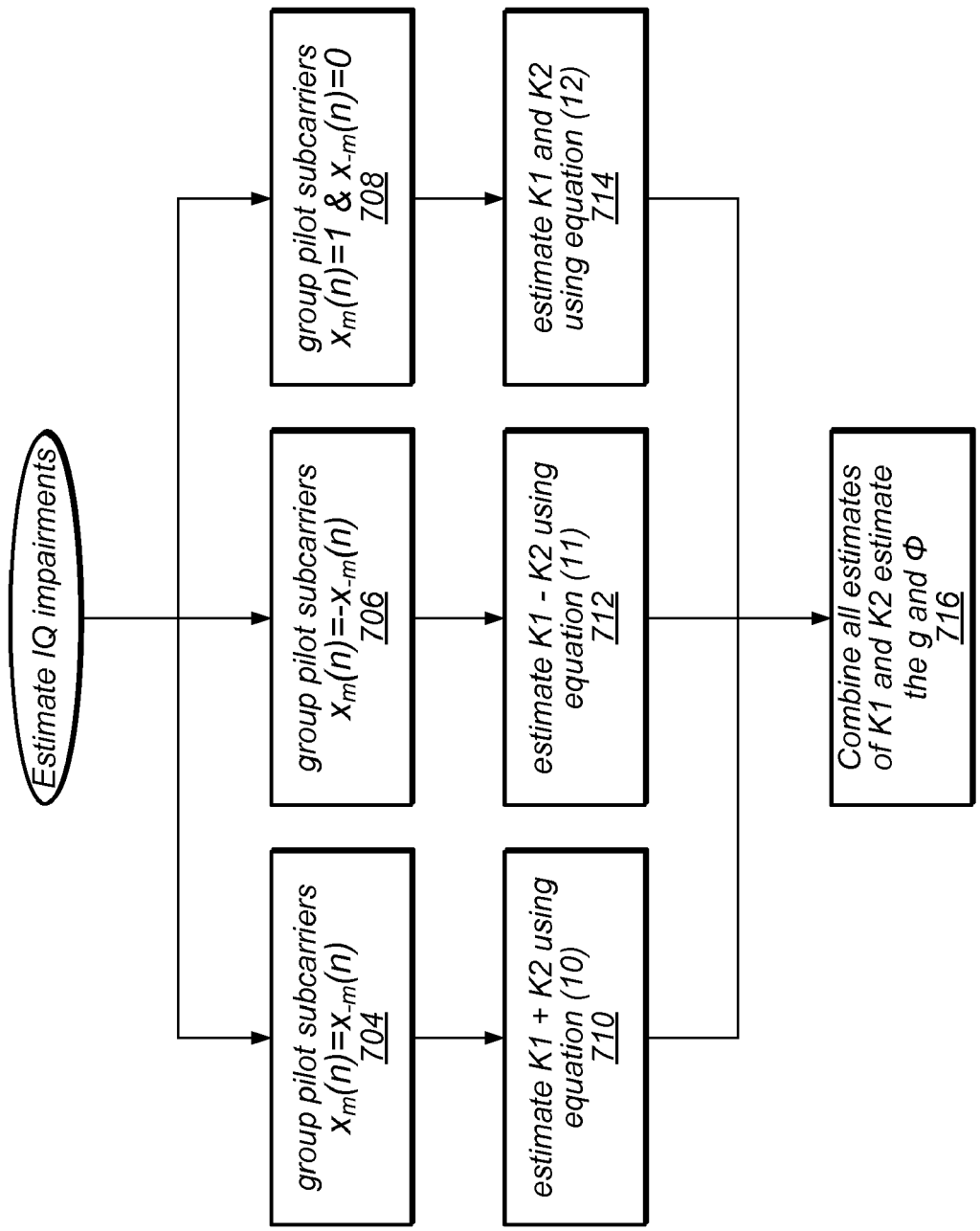

FIGS. 6 and 7—Method for Estimating IQ Impairments in an OFDM Signal

An OFDM device under test may have one or more other impairments in addition to IQ impairments, such as frequency offset, clock offset and phase noise. In some embodiments, these impairments may need to be estimated and compensated for before the IQ impairments can be estimated. FIG. 6 is a flowchart diagram illustrating an exemplary flow of preliminary steps that may be taken before estimating IQ impairments in an OFDM signal in some embodiments. FIG. 7 is a flowchart diagram illustrating how IQ impairments in an OFDM signal may be estimated according to some embodiments.

The methods shown in FIGS. 6 and 7 and described below may be implemented by a computer system. For example, a system is contemplated including one or more processors and a computer readable memory medium. The memory medium may store program instructions executable by the one or more processors to implement the method. The system may also include an input for receiving signals, and/or any other components typical of a computer system, as desired. Embodiments including a computer readable memory medium storing program instructions executable by a computer system to implement the method are also contemplated.

In various embodiments, some of the method elements shown may be performed concurrently, performed in a different order than shown, or omitted. Additional method elements may also be performed as desired. As shown, this method may operate as follows.

In 602, an OFDM signal may be generated by an OFDM device (e.g., the DUT). In 604, the signal may be acquired, e.g., using a measurement device (e.g., an RF Signal analyzer) and the acquired signal may be down converted to the complex baseband signal. The device under test may be configured to generate the OFDM signal with BPSK pilot subcarriers. The pilots may be symmetric; for example, the $k^{th}$ subcarrier and its opposite (also referred to as an "image" or "mirror") subcarrier may both be pilots. The timing and frequency offset may be estimated (step 606) from the acquired signal and then may be compensated (step 608). A discrete Fourier transform (DFT) may be applied to the compensated signal, converting the symbols to the frequency domain (step 610).

As previously noted, the symbols in frequency domain for each subcarrier m, and its image subcarrier-m, can be written as per equations (6) and (7). The pilot subcarriers of a symbol in the OFDM signal may be extracted from the symbol (step 612), and the phases of the pilot subcarriers may be computed (step 614). The phases of the pilot subcarriers may be fit to a straight line, whose intercept and slope may be estimated (step 616). The intercept may be used as an estimate of the common phase error, because of residual frequency offset and the phase noise of the local oscillator. The slope of the straight line may be used as an estimate of the sampling clock and timing error. The slope and intercept estimates may be used to compensate for the residual frequency offset, phase noise, sampling clock offset and timing error, e.g., to de-rotate the pilot subcarriers for the common phase (because of phase noise and residual frequency offset) and the incremental phase (because of clock offset and timing) (step 618).

After compensating for other impairments in the OFDM signal, e.g., as described above with respect to FIG. 6, IQ impairments may be estimated. According to some embodiments, IQ impairment estimation may be performed as shown in FIG. 7.

As noted above, the pilot subcarriers may typically be modulated using BPSK. Under the assumption that the pilot subcarriers are BPSK, Equations (6) and (7) can be written as:

$$z_m(n) = K1 \cdot x_m(n) + K2 \cdot x_{-m}(n) \quad (8)$$

$$z_{-m}(n) = K1 \cdot x_{-m}(n) + K2 \cdot x_m(n) \quad (9)$$

The pilot subcarriers can then be grouped according to what relation(s) they satisfy relative to their image subcarrier. In other words, an image subcarrier of a pilot subcarrier may also be known to the receiver, e.g., may be another pilot subcarrier, a null subcarrier, or the image subcarrier may be a data subcarrier, if the data transmitted is known to the receiver. Thus, each pilot subcarrier may satisfy one or more equations based on the relation between that pilot and its image subcarrier.

If a pilot subcarrier's image subcarrier has the same value as the pilot (e.g., if both subcarriers are 1, or both subcarriers are −1), that pilot may satisfy the condition $x_m(n)=x_{-m}(n)$. Given this condition, equation (8) may be rewritten (removing the symbol index (n) henceforth for simplicity) as:

$$z_m = K1 + K2 \quad (10)$$

In step 704, subcarriers which meet this condition may be grouped together. It should be noted that the above equation assumes the pilot values are unity; if this is not a valid assumption, the equation (as well as equations (11) and (12) below) may be compensated for the pilot gain.

If a pilot subcarrier's image subcarrier has the opposite value as the pilot (e.g., if the subcarrier values are 1 and −1, or −1 and 1), that pilot may satisfy the condition, $x_m(n)=-x_{-m}(n)$, and equation (8) may be re-written as:

$$z_m = K2 - K2 \quad (11)$$

In step 706, subcarriers which meet this condition may be grouped together.

If a pilot subcarrier has a null subcarrier as its image subcarrier, that pilot may satisfy the condition $x_m(n)=1$ and $x_{-m}(n)=0$, and equations (8) and (9) may be re-written as:

$$z_m = K1 \text{ and } z_{-m} = K2 \quad (12)$$

In step 708, subcarriers which meet this condition may be grouped together.

Thus, in steps 710, 712, and 714, by solving equations (10), (11), and (12) respectively, the values of K1 and K2 may be estimated. In step 716, the estimated values for IQ gain imbalance g and quadrature skew Φ may then be calculated using equation (3).

The methods of FIGS. 6 and 7 may be repeated for as many symbols in the OFDM signal as desired; IQ impairments estimates may thus be averaged over a plurality of symbols, if desired.

FIGS. 8A-8G—Case Studies

FIGS. 8A-8G are graphs illustrating burst constellations for exemplary OFDM signals according to various embodiments. The various burst constellations shown in FIGS. 8A-8G represent signals generated (e.g., by a signal generator, such as shown in FIG. 4) to simulate OFDM signals with varying levels of impairments. The particular case studies shown represent actual test results generated according to a test setup in which the signals are generated according to the IEEE 802.16-2004 and IEEE 802.16e-2005 Wireless MAN OFDMA Physical layer standard, including an uplink PUSC zone with 39 symbols, by an RF Signal Generator. The signals are then acquired using an RF signal analyzer. It will be noted that in each of the plots, there is always a pilot at +1, because according to this particular standard, after subcarrier de-randomization at the receiver the pilot polarity is always positive.

Figure 8A:
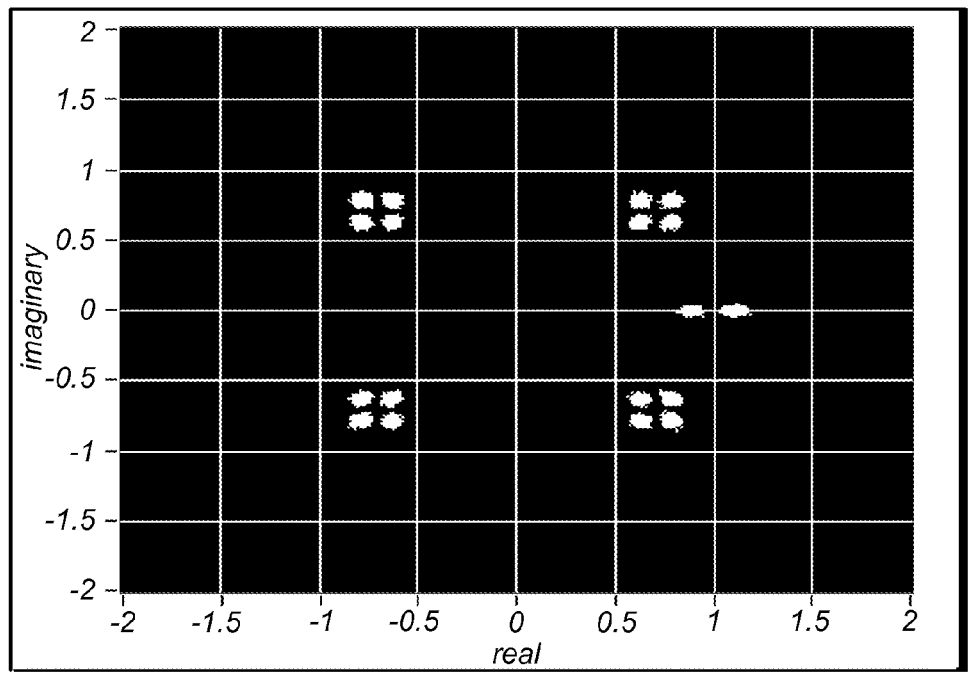
FIGS. 8A-8G are graphs illustrating burst constellations for exemplary OFDM signals according to various embodiments.

FIG. 8A illustrates a case study in which QPSK modulation is used, in which a gain imbalance g of 2 dB has been simulated. In this case no additive white gaussian noise (AWGN) has been added to the signal.

Figure 8B:
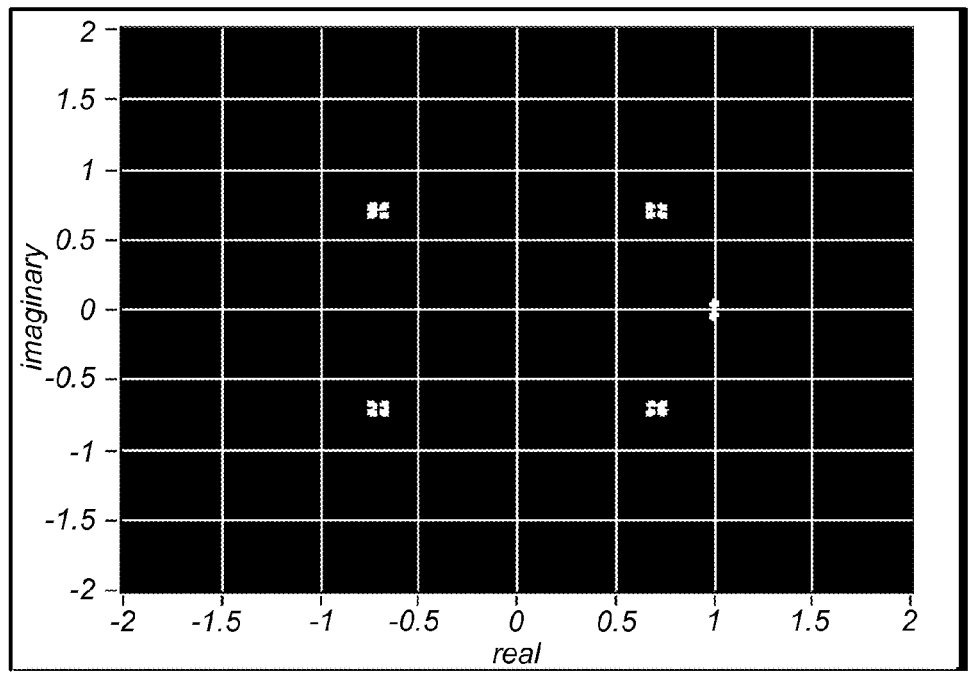
Figure 8C:
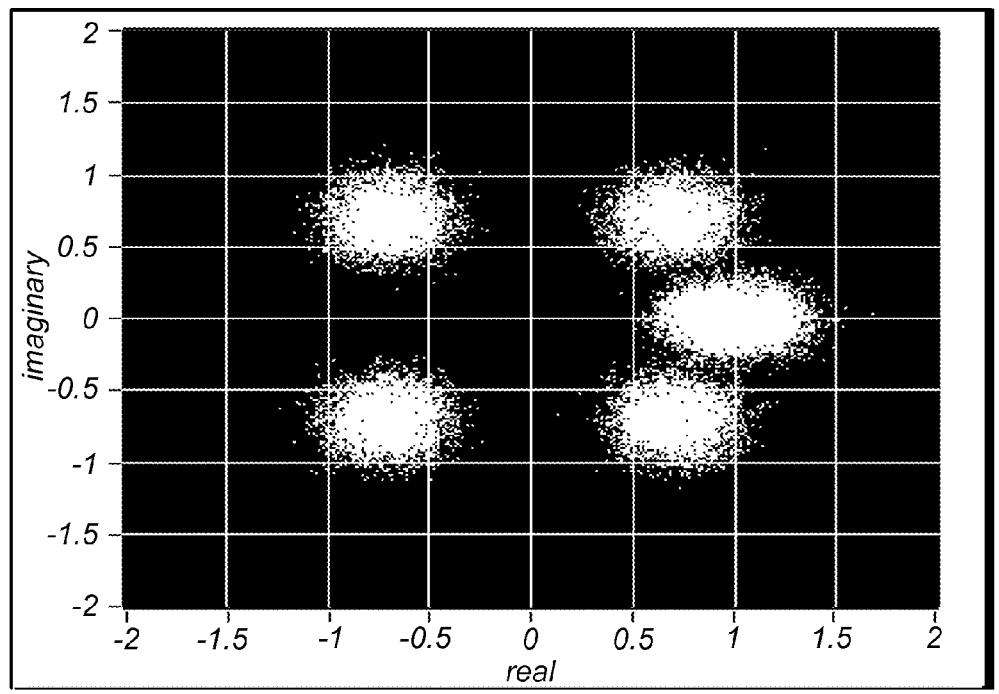

FIG. 8B also illustrates a case study in which QPSK modulation is used. In this case, no gain imbalance has been added to the signal, but a quadrature skew Φ of 5 degrees has been added to the signal. Again in this case no AWGN has been added to the signal.

FIG. 8C again illustrates a case study in which QPSK modulation is used. In this case, 2 dB gain imbalance has been added to the signal, and no quadrature skew, but AWGN has been added such that the carrier-to-noise ratio (CNR) is 15 dB. Because of the high noise power, the effect of the IQ impairments is not visible in the burst diagram, but the method may still accurately estimate the IQ impairments in this case, as can be seen in Table 1 below.

Figure 8D:
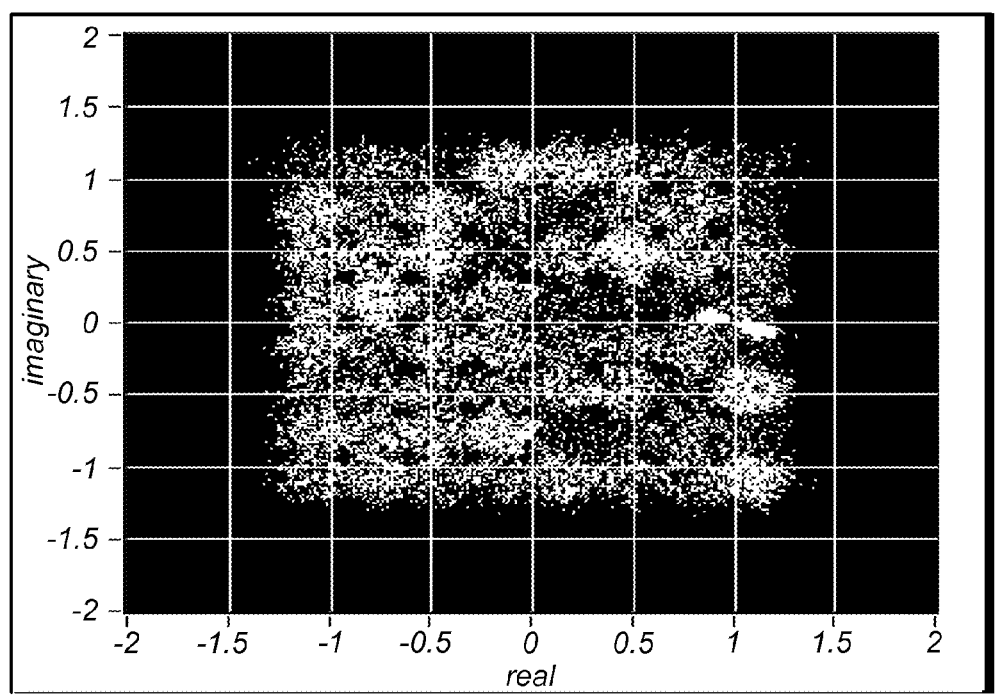

FIG. 8D illustrates a case study in which 64QAM modulation is used. In this case both a gain imbalance of 2 dB and a quadrature skew of 5 degrees have been added to the signal, but no AWGN has been added.

Figure 8E:
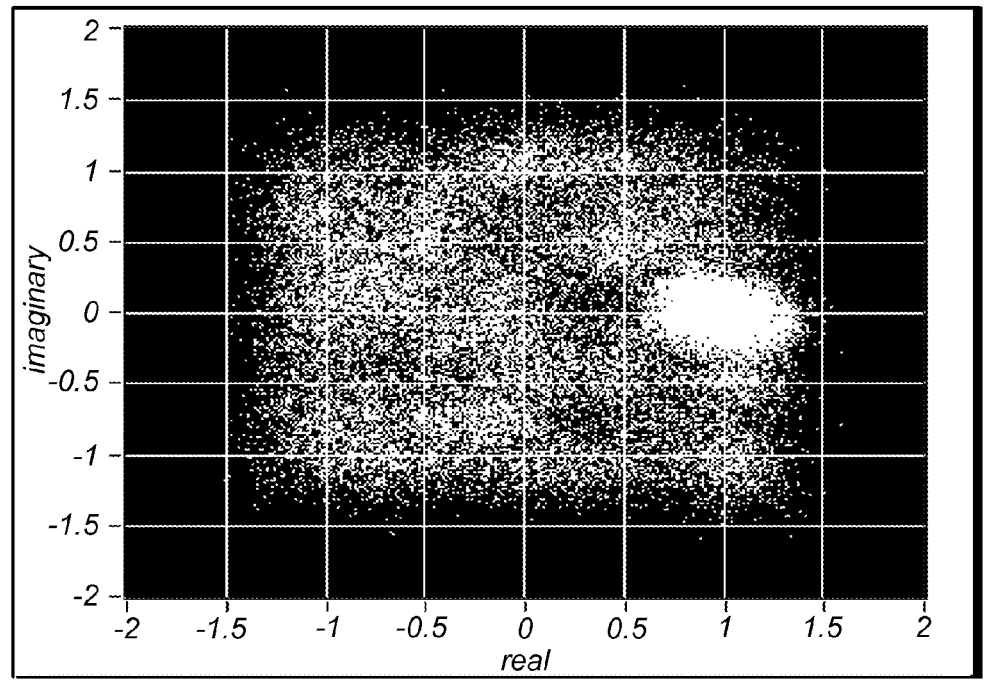

FIG. 8E illustrates a case study in which 64QAM modulation is again used. In this case, a gain imbalance of 2 dB, a quadrature skew of 5 degrees, and AWGN to the effect of a CNR of 15 dB have been added to the signal. As in FIG. 8C, the effect of the IQ impairments is not visible in the burst diagram, but the method may again accurately estimate the IQ impairments, as can be seen from the results in the Table 1 below.

Figure 8F:
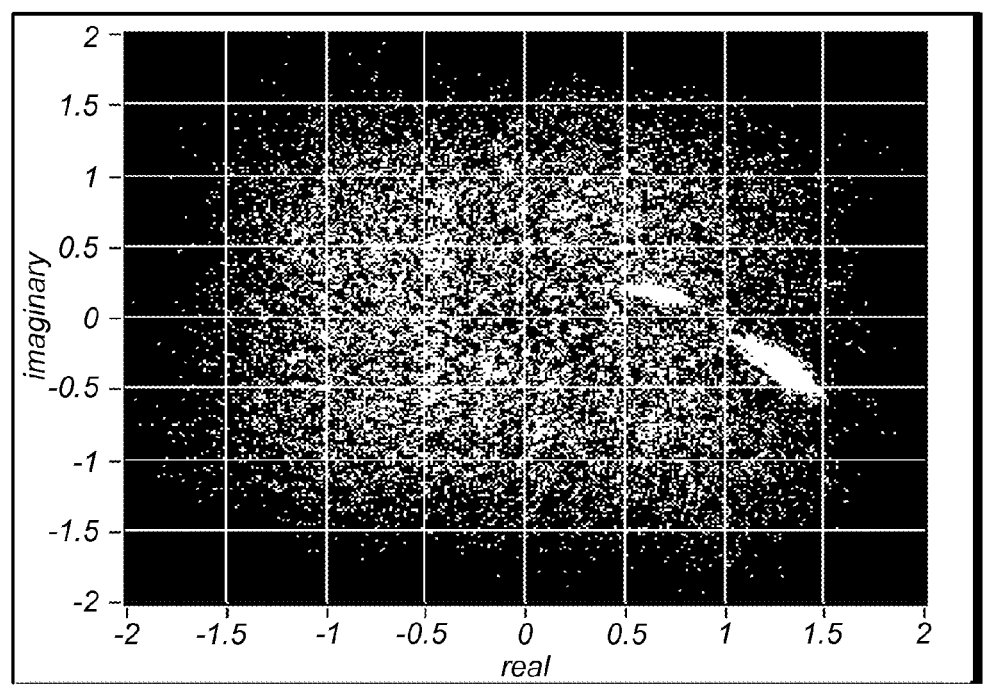

FIG. 8F illustrates another case study in which 64 QAM modulation is used. In this case, high IQ impairments have a significant visible distorting effect on the signal. The IQ impairments simulated in this case include a gain imbalance of 6 dB and a quadrature skew of 30 degrees.

Figure 8G:
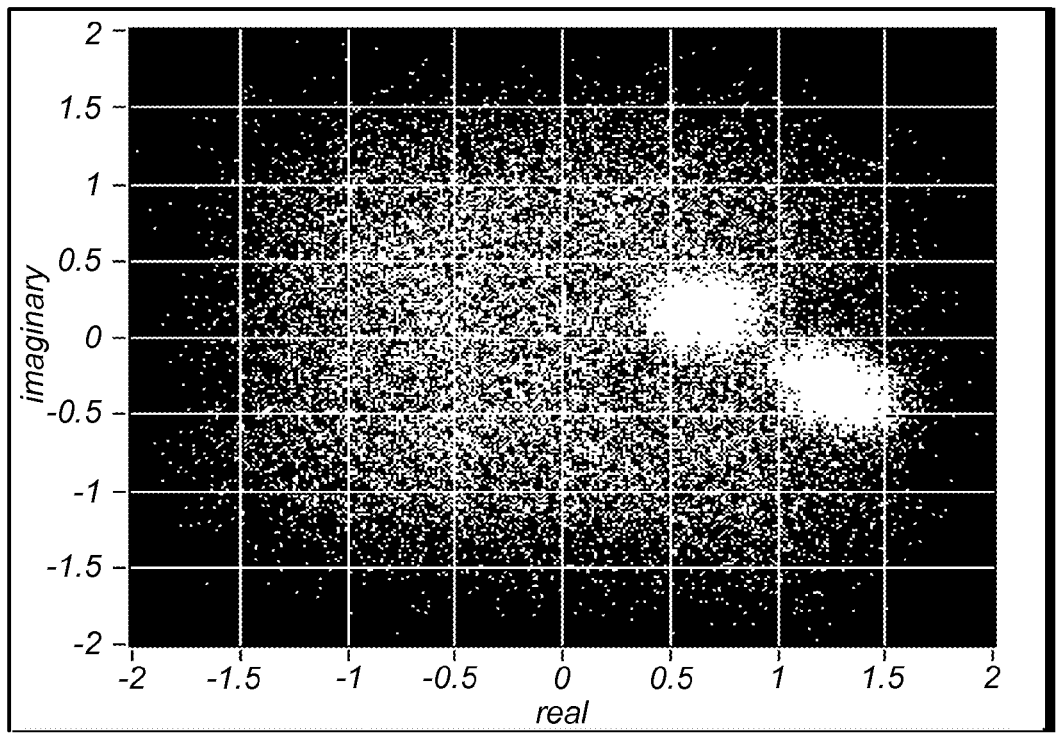

FIG. 8G again illustrates a case study in which 64 QAM modulation is used. The same high IQ impairments as used in the case study of FIG. 8F (gain imbalance of 6 dB and quadrature skew of 30 degrees) are used in this case. In addition, AWGN has been added to effect a CNR of 15 dB. Because of the high IQ impairments and the noise, the signal appears totally distorted, as can be seen in FIG. 8G. However, as shown in the results table below, embodiments of the method described herein may still accurately estimate the IQ impairments under these conditions.

TABLE 1

IQ impairment measurement results under practical conditions

| Case Study | AWGN (CNR in dB) | Applied IQ gain imbalance (dB) | Measured IQ gain imbalance | | Applied Quadrature Skew | Measured Quadrature Skew | |
|---|---|---|---|---|---|---|---|
| | | | Average | Std. deviation | | Average | Std. deviation |
| 1 | NA | 2 | 1.996 | 0.0003 | 0 | 0.018 | 0.002 |
| 2 | NA | 0 | −0.0002 | 0.0005 | 5 | 4.988 | 0.003 |
| 3 | 15 | 2 | 1.997 | 0.0007 | 0 | 0.26 | 0.004 |
| 4 | NA | 2 | 1.996 | 0.0005 | 5 | 4.994 | 0.003 |
| 5 | 15 | 2 | 2.01 | 0.0006 | 5 | 5.03 | 0.003 |
| 6 | NA | 6 | 5.992 | 0.0006 | 30 | 29.96 | 0.003 |
| 7 | 15 | 6 | 6.02 | 0.0008 | 30 | 29.82 | 0.005 |

Table 1 illustrates test results for each of the case studies described above, where 100 iterations were used for each case study. As can be seen, the method is capable of estimating the actual applied gain imbalance and quadrature skew to a high degree of accuracy under all of the conditions tested.

The method described herein appears to work well in practical test conditions even for very low signal to noise ratios, e.g., down to 10 dB, or possibly lower. The method may be based primarily on use of the pilot subcarriers present in an OFDM symbol. Almost all wireless standards, including WLAN, Fixed WiMax, Mobile WiMax, LTE, and many others, have pilot subcarriers in the data OFDM symbols. The method described herein should thus be applicable to all standards that meet this requirement. In particular, this method will be very efficient if the transmitted data in all the subcarriers of the symbol is known. This algorithm can also be extended to other modulation schemes. The measurements may, for example, be very close to the measurements of simulated impairments as per Table. 1. Embodiments of the method may thus be ideal for design validation and verification and in manufacturing of OFDM based devices, in order to detect the component defects.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for evaluating a transmitter by estimating IQ impairments in an orthogonal frequency division multiplexed (OFDM) signal generated by the transmitter, the method comprising:

receiving the OFDM signal from a transmitter, wherein the OFDM signal represents a stream of symbols each comprising a plurality of subcarriers, wherein at least a subset of the plurality of subcarriers are pilot subcarriers;

grouping the pilot subcarriers into a plurality of groups of pilot subcarriers based on a plurality of different conditions, wherein pilot subcarriers which each relate to a respective mirror subcarrier in a way that satisfies a condition of the plurality of different conditions are grouped together;

calculating an estimate of complex IQ imbalance parameters, wherein calculating the estimate of the complex IQ imbalance parameters comprises solving a plurality of equations for the complex IQ imbalance parameters, wherein the plurality of equations comprise a plurality of different relations between groups of pilot subcarriers and the complex IQ imbalance parameters, wherein the plurality of different relations are based on the plurality of different conditions;

calculating an estimate of gain imbalance and quadrature skew of the OFDM signal based on the complex IQ imbalance parameters, wherein calculating the estimate of gain imbalance and quadrature skew comprises solving equations relating the complex IQ imbalance parameters to gain imbalance and quadrature skew of the OFDM signal;

wherein the estimate of gain imbalance and quadrature skew of the OFDM signal is used to evaluate the transmitter.

2. The method of claim 1, wherein the plurality of different conditions comprise two or more of:

$$x_m(n) = x_{-m}(n);  \quad (1)$$

$$x_m(n) = -x_{-m}(n); \text{ or} \quad (2)$$

$$x_m(n) = 1 \text{ and } x_{-m}(n) = 0; \quad (3)$$

wherein $x_m(n)$ represents an ideal pilot subcarrier and $x_{-m}(n)$ represents an ideal mirror subcarrier of a symbol n.

3. The method of claim 2, wherein the equations relating groups of pilot subcarriers and the complex IQ imbalance parameters comprise two or more of:

$$z_m = K1 + K2 \quad (4)$$

$$z_m = K1 - K2, \quad (5)$$

$$z_m = K1 \text{ and } z_{-m} = K2, \quad (6)$$

wherein $z_m$ represents a received pilot subcarrier and $z_{-m}$ represents a received mirror subcarrier of the received pilot subcarrier, wherein equation (4) relates a group of pilot subcarriers which satisfy the condition (1) to the complex IQ imbalance parameters, wherein equation (5) relates a group of pilot subcarriers which satisfy the condition (2) to the complex IQ imbalance parameters, wherein equations (6) relate a group of pilot subcarriers which satisfy the conditions (3) to the complex IQ imbalance parameters;

wherein the equations relating the complex IQ imbalance parameters to gain imbalance and quadrature skew of the OFDM signal comprise:

$$K1 = \frac{1 + ge^{-j\phi}}{2} \text{ and } K2 = \frac{1 - ge^{j\phi}}{2}, \quad (7)$$

wherein K1 represents a first IQ imbalance parameter, K2 represents a second IQ imbalance parameter, g represents the gain imbalance, and $\phi$ represents the quadrature skew.

4. The method of claim 1, wherein said calculating the estimate of gain imbalance and quadrature skew of the received OFDM signal is based on a model of the OFDM signal in which:

$$x(t) = \cos(2 \cdot \pi \cdot f \cdot t) + j \cdot g \cdot \sin(2 \cdot \pi \cdot f \cdot t + \Phi);$$

wherein x(t) represents the OFDM signal in the time domain, f represents a carrier frequency, g represents the gain imbalance, $\Phi$ and represents the quadrature skew.

5. The method of claim 1, wherein the pilot subcarriers are binary phase shift keyed (BPSK) subcarriers.

6. The method of claim 1, further comprising:
performing one or more signal processing techniques on the OFDM signal after said receiving and prior to said grouping, wherein the one or more signal processing techniques include one or more of:
estimating one or more other impairments to the OFDM signal;
compensating for one or more other impairments to the OFDM signal; or
converting the OFDM signal to a frequency domain.

7. The method of claim 1, further comprising:
downconverting the OFDM signal to a complex baseband signal after said receiving and prior to said grouping.

8. The method of claim 1,
wherein the plurality of groups of pilot subcarriers comprise at least first and second groups of pilot subcarriers, wherein the first group of pilot subcarriers comprises first pilot subcarriers which relate to mirror subcarriers in a way that satisfies a first condition and the second group of pilot subcarriers comprises second pilot subcarriers which relate to mirror subcarriers in a way that satisfies a second condition;
wherein a first equation of the plurality of equations comprises a first relation between first pilot subcarriers and the complex IQ imbalance parameters, wherein the first relation is based on the first condition, wherein a second equation of the plurality of equations comprises a second relation between second pilot subcarriers and the complex IQ imbalance parameters, wherein the second relation is based on the second condition.

9. A system for evaluating a transmitter by estimating IQ impairments in an orthogonal frequency division multiplexed (OFDM) signal generated by the transmitter, the system comprising:
a processor;
an input for receiving the OFDM signal;
a memory medium storing program instructions executable by the processor, wherein the program instructions are executable to:
receive the OFDM signal from a transmitter via the input, wherein the OFDM signal represents a stream of symbols each comprising a plurality of subcarriers, wherein at least a subset of the plurality of subcarriers are pilot subcarriers;
group the pilot subcarriers into a plurality of groups of pilot subcarriers based on a plurality of different conditions, wherein pilot subcarriers which each relate to a respective mirror subcarrier in a way that satisfies a condition of the a plurality of different conditions are grouped together;
calculate an estimate of complex IQ imbalance parameters, wherein calculating the estimate of the complex IQ imbalance parameters comprises solving a plurality of equations for the complex IQ imbalance parameters, wherein the plurality of equations comprise a plurality of different relations between groups of pilot subcarriers and the complex IQ imbalance parameters, wherein the plurality of different relations are based on the plurality of different conditions;
calculate an estimate of gain imbalance and quadrature skew of the OFDM signal based on the complex IQ imbalance parameters, wherein calculating the estimate of gain imbalance and quadrature skew comprises solving equations relating the complex IQ imbalance parameters to gain imbalance and quadrature skew of the OFDM signal;
wherein the estimate of gain imbalance and quadrature skew of the OFDM signal is used to evaluate the transmitter.

10. The system of claim 9, wherein the plurality of different conditions comprise two or more of:

$$x_m(n) = x_{-m}(n);$$

$$x_m(n) = -x_{-m}(n); \text{ or}$$

$$x_m(n) = 1 \text{ and } x_{-m}(n) = 0;$$

wherein $x_m(n)$ represents an ideal pilot subcarrier and $x_{-m}(n)$ represents an ideal mirror subcarrier of a symbol n.

11. The system of claim 9, wherein said program instructions executable to calculate the estimate of gain imbalance and quadrature skew of the received OFDM signal are based on a model of the OFDM signal in which:

$$x(t)=\cos(2\pi f t)+j \cdot g \cdot \sin(2\pi f t+\Phi);$$

wherein x(t) represents the OFDM signal in the time domain, f represents a carrier frequency, g represents the gain imbalance, and Φ represents the quadrature skew.

12. The system of claim 9,
wherein the pilot subcarriers are binary phase shift keyed (BPSK) subcarriers.

13. The system of claim 9, wherein the program instructions are further executable to:
perform one or more signal processing techniques on the OFDM signal after receiving the OFDM signal and prior to grouping the pilot subcarriers, wherein the one or more signal processing techniques include one or more of:
estimation of one or more other impairments to the OFDM signal;
compensation for one or more other impairments to the OFDM signal; or
conversion of the OFDM signal to a frequency domain.

14. The system of claim 9, wherein the program instructions are further executable to:
downconvert the OFDM signal to a complex baseband signal after receiving the OFDM signal and prior to grouping the pilot subcarriers.

15. A non-transitory computer readable memory medium storing program instructions for evaluating a transmitter by estimating IQ impairments in an orthogonal frequency division multiplexed (OFDM) signal generated by the transmitter, wherein the OFDM signal is received from the transmitter, wherein the OFDM signal represents a stream of symbols each comprising a plurality of subcarriers, wherein at least a subset of the plurality of subcarriers are pilot subcarriers, wherein the program instructions are executable to:
group the pilot subcarriers into a plurality of groups of pilot subcarriers based on a plurality of different conditions, wherein pilot subcarriers which each relate to a respective mirror subcarrier in a way that satisfies a condition of the a plurality of different conditions are grouped together;
calculate an estimate of complex IQ imbalance parameters, wherein calculating the estimate of the complex IQ imbalance parameters comprises solving a plurality of equations for the complex IQ imbalance parameters, wherein the plurality of equations comprise a plurality of different relations between groups of pilot subcarriers and the complex IQ imbalance parameters, wherein the plurality of different relations are based on the plurality of different conditions;
calculate an estimate of gain imbalance and quadrature skew of the OFDM signal based on the complex IQ imbalance parameters, wherein calculating the estimate of gain imbalance and quadrature skew comprises solving equations relating the complex IQ imbalance parameters to gain imbalance and quadrature skew of the OFDM signal;
wherein the estimate of gain imbalance and quadrature skew of the OFDM signal is used to evaluate the transmitter.

16. The non-transitory computer readable memory medium of claim 15, wherein the plurality of different conditions comprise two or more of:

$$x_m(n)=x_{-m}(n); \quad (1)$$

$$x_m(n)=-x_{-m}(n); \text{ or} \quad (2)$$

$$x_m(n)=1 \text{ and } x_{-m}(n)=0; \quad (3)$$

wherein $x_m(n)$ represents an ideal pilot subcarrier and $x_{-m}(n)$ represents an ideal mirror subcarrier of a symbol n.

17. The non-transitory computer readable memory medium of claim 15, wherein said program instructions executable to calculate the estimate of gain imbalance and quadrature skew of the received OFDM signal are based on a model of the OFDM signal in which:

$$x(t)=\cos(2\pi f t)+j \cdot g \cdot \sin(2\pi f t+\Phi);$$

wherein x(t) represents the OFDM signal in the time domain, f represents a carrier frequency, g represents the gain imbalance, and Φ represents the quadrature skew.

18. The non-transitory computer readable memory medium of claim 15,
wherein the pilot subcarriers are binary phase shift keyed (BPSK) subcarriers.

19. The non-transitory computer readable memory medium of claim 15, wherein the program instructions are further executable to:
perform one or more signal processing techniques on the OFDM signal after receiving the OFDM signal and prior to grouping the pilot subcarriers, wherein the one or more signal processing techniques include one or more of:
estimation of one or more other impairments to the OFDM signal;
compensation for one or more other impairments to the OFDM signal; or
conversion of the OFDM signal to a frequency domain.

20. The non-transitory computer readable memory medium of claim 15, wherein the program instructions are further executable to:
downconvert the OFDM signal to a complex baseband signal after receiving the OFDM signal and prior to grouping the pilot subcarriers.

* * * * *